(12) United States Patent
Edwards

(10) Patent No.: US 6,615,763 B2
(45) Date of Patent: Sep. 9, 2003

(54) PRINTING ON MICROSCOPE SLIDES AND HISTOLOGY CASSETTES

(75) Inventor: Peter Spencer Edwards, Sligo (IE)

(73) Assignee: Innovative Science Limited (IE)

( * ) Notice: Subject to any disclaimer, the term of this patent is extended or adjusted under 35 U.S.C. 154(b) by 0 days.

(21) Appl. No.: 09/853,554

(22) Filed: May 11, 2001

(65) Prior Publication Data

US 2001/0039896 A1 Nov. 15, 2001

(30) Foreign Application Priority Data

May 12, 2000 (IE) .............................................. S000369
Sep. 18, 2000 (EP) ............................................. 00203233

(51) Int. Cl.$^7$ ................................................ B05C 5/02
(52) U.S. Cl. ........................ 118/46; 118/300; 118/324; 347/1
(58) Field of Search .................... 118/46, 686, 300, 118/324; 347/1; 101/424.2

(56) References Cited

U.S. PATENT DOCUMENTS

| 4,515,867 A | * | 5/1985 | Bleacher et al. ............. 428/204 |
| 5,561,556 A | | 10/1996 | Weissman .................... 359/396 |
| 5,683,786 A | | 11/1997 | Kavanaugh ................. 428/195 |
| 5,815,282 A | * | 9/1998 | Kano .......................... 358/296 |
| 5,963,368 A | | 10/1999 | Domanik et al. ........... 359/396 |
| 6,007,610 A | * | 12/1999 | Matzinger et al. ....... 106/14.05 |

FOREIGN PATENT DOCUMENTS

GB          2 235 163 A          2/1991

* cited by examiner

Primary Examiner—Laura Edwards
(74) Attorney, Agent, or Firm—Rossi & Associates

(57) ABSTRACT

An apparatus for applying information to a medical slide or histology cassette has an ink jet printer for printing a printing medium directly onto the slide cassette. The printing medium or the ink is placed onto the slide or cassette so that the resulting printed data is impervious against removal or damage during subsequent handling or treatment of the slide or cassette.

15 Claims, 12 Drawing Sheets

PRINTING ON MICROSCOPE SLIDES AND HISTOLOGY CASSETTES

BACKGROUND OF THE INVENTION

1. Field of the Invention

The present invention relates to the application of information to microscope slides and histology cassettes, especially by printing on microscope slides and histology cassettes. In particular, the invention is directed to an automatic system for printing on a microscope slide or a histology embedding cassette. The invention is further directed to the sealing of printed matter onto a microscope slide or a histology embedding cassette. The invention is particularly directed to the printing of data onto items of this kind in a manner such that when sealed, the print is not removed by any subsequent operations involving contacting the items (i.e. slides or cassettes) with chemicals.

2. Description of the Prior Art

Throughout the world, steps are being taken to improve the legibility of data written onto microscope slides and cassettes. Due to the chemical processes that these items have to pass through after they have been prepared with a sample, it has been inherently difficult to improve on the currently used system of writing in pencil onto such slides or cassettes. As slides or cassettes of this kind in most cases have to be archived for many years, legibility is a real issue addressed by the present invention. Untold stress can be caused to a patient if a sample goes astray due to losing its identification marking during processing. Often another sample has to be acquired, which can cause further severe anxiety to the patient. Another area addressed by the present invention is the amount of data that can be printed onto a slide or cassette. It is not possible with present methods to place much information onto the small area at the end of a slide and the even smaller area on the front edge of a histology cassette. The present invention is also directed therefore to enabling the printing of a greater quantity of data than before.

U.S. Pat. No. 5,683,786 issued to Kavanaugh discloses a method of marking a slide by etching away areas of a coating, using a laser, to form machine readable coding. More specifically, on a microscope slide having a glass plate, a marking surface coating is provided on an area of the glass plate, and indicia are formed by etching away portions of the marking surface coating. The marking surface coating may comprise an epoxy resin material, a ceramic material, or any other substance capable of being affixed as a layer onto a glass surface. The indicia may include machine-readable indicia, human-readable indicia, or both machine-readable and human-readable indicia. In order to produce accurate, high-quality indicia, a laser directed by a computer controller may be used to etch away portions of the marking surface coating. There is provided a method of marking a microscope slide having an upper surface and a lower surface, a marking surface formed of a coating being affixed to at least a portion of one of the upper and lower surfaces of the microscope slide. In a further marking step, there is etched into the coating, a configuration which exposes a corresponding portion of the microscope slide and thereby defines a substantially permanent identifying indicia in the coating of the microscope slide. This patent teaches away from the direct printing of readable data on the end of a conventional microscope slide.

U.S. Pat. No. 5,561,556 issued to Weissman discloses a method for providing a high density recording medium, in the form of a magnetic strip or an optical reading strip, on one side of a microscope slide, thus allowing data to be permanently stored on the slide and to be read by or written to using a computer system or the like. According to this U.S. patent, in a microscope slide read-write system, the slide has a pathology specimen on it and also machine-readable high density recording media in the form of a magnetic strip, an optical reading strip or the like. The read-write system accommodates initial writing of slide and patient identification information on the recording media, as well as further elements for operative connection to a microscope system for recordal of a computer-generated representation of the screening history of a pathology specimen, this history to be maintained during pathology analysis of the slide to show the mode and parameters of the analysis as well as position-related events of interest. The computer-generated screening representation is written to the recording media by the read-write system for consequent proximate availability with the slide. In a system for providing a pathology slide having a specimen on the slide with integral recordation of parameters of the manner in which microscope screening of the specimen is effected and interpretation of the results of the screening analysis of the specimen, for proximate review without need for external data sources, a microscope viewable slide has two sides, the specimen being on one side. The slide also has a machine-writeable and readable recording medium on it with a storage capacity of at least 70 bytes. The recording medium has long-term stability and is provided on the slide at a position removed from the position of the specimen or alternatively at a position in visual alignment with this specimen. The system also includes means for writing relevant information relative to a source of the specimen on the recording medium, means for reading and displaying the relevant source information, and means for recording information of screening parameters and analysis of the specimen during screening, as well as means for downloading the recorded information to the recording medium for subsequent retrieval. This patent teaches away from conventional marking techniques and the use of conventional slides.

U.S. Pat. No. 5,866,241 to Yang provides a microscope slide treated to provide frosted or etched surfaces along the sides of the slide. One of the frosted surfaces is covered with a colour coating and the treated surfaces may be selectably marked with conventional ink or pencil markings. The invention is directed to avoiding the necessity to apply labels or separate materials to the slides, in order to record information. The invention is further directed to providing a slide surface which will ensure permanent retention of identification markings to facilitate identification of specific slides. According to this patent, there is therefore provided a microscope slide having a body portion with an upper and a lower surface, each defining a plane. A segment of the upper surface includes a first frosted surface area which does not extend outwardly beyond the plane defined by the upper surface. A segment of the lower surface also includes a second frosted surface area which likewise does not extend outwardly beyond the plane defined by the lower surface. A colour coating is applied to the first frosted surface area in such a manner as to form a coated frosted surface area which does not extend outwardly beyond the plane of the upper surface. The coated frosted surface area and the second frosted surface area are suitable for selective reception of indicia thereon. This patent again teaches away from the direct printing or provision of information on a microscope slide without first providing for treatment of the surface of the slide to which the information is to be applied.

Printers are known providing for the printing of pertinent information onto white or colour-painted slides. Similar instruments are likewise known for printing onto cassettes, either cassettes with hinged lids or cassettes without lids. Data may be entered through a standard keyboard or by linking the instrument to a laboratory computer, in which case information is downloaded from the computer to the printer through a memory storage device such as a buffer. The imprinting provided by these instruments is said to be resistant to all normal laboratory solutions, for example such as are used for staining slides and in the treatment of cassettes. However, the instruments in question are individually adapted either to slides or cassettes, so that a laboratory handling both slides and cassettes requires two instruments, one for slides and the other for cassettes, which, while appropriate in a large operation handling considerable numbers of both slides and cassettes, for example, in separate slide-only and cassette-only laboratories, may not be best suited to a smaller laboratory, with lower levels of slide and cassette throughput. A significant financial outlay is required for the provision of two machines, and an operative's versatility is also restricted, in that a change from slide labelling to cassette labelling or vice versa requires moving from one instrument to the other, both factors being potentially disadvantageous in a smaller laboratory handling both slides and cassettes. These known instruments do not therefore provide for selective labelling of slides and cassettes within a single unit or system, at the option of the operator.

In another known system, a diamond stylus is used to engrave information on glass slides. This manner of operation results in the necessity for glass dust to be collected within the machine, while a relatively high level of breakages may also be experienced.

BRIEF SUMMARY OF THE INVENTION

Although there have been therefore a number of inventions relating to microscope slide and cassette printing systems, none have been sufficiently compact, reliable or low in cost so as to become commonly used. The present invention is directed to meeting the requirements of a simplified design, providing versatility, low cost, ease of installation and maintenance, and requiring only a minimal amount of training to enable an operative to successfully apply the invention.

Accordingly, it is an object of the present invention to provide a printing system that will enable printed matter to be provided on microscope slides and cassettes efficiently and effectively.

It is another object of the present invention to print sufficient legible data onto the microscope slide or cassette to meet laboratory requirements and practices.

It is a further object of the present invention to apply to a printed slide or cassette, a coating that will not be contaminated or degraded by the solvents with which it comes into contact.

It is yet another object of the present invention to provide for the storage in a printing system of a large number of slides and cassettes, to enable through-put of printed slides and cassettes to be speeded up.

It is still another objective of the present invention to provide for storage and processing of slides and cassettes of different colours, thereby allowing different operatives their choice of colours.

Yet another objective of the present invention is to allow data to be entered in various forms, either by keyboard, external connection or bar code reader.

A final objective of the present invention, which is particularly enumerated herein, is to provide a slide and cassette printer in accordance with the preceding objects, while also facilitating manufacture in convenient form in a simple construction which is easy to use, thus providing a device that is economically viable, long-lasting and relatively trouble-free in operation.

The present invention thus provides in one aspect an automatic system for printing onto microscope slides and histology cassettes.

However, according to the invention in a first and widest aspect, there is provided a method for applying information to a medical slide or histology cassette, the method being characterised in that a printing medium is applied directly onto a surface portion of a slide or cassette to define an organised array of printed data, the printing medium being sealable onto said surface portion of the slide or cassette so that said organised array of printed data is proof against removal or damage during subsequent handling or treatment of the slide or cassette.

In a preferred embodiment, the printing medium is directly sealable to said surface portion of the slide or cassette. A vinyl resin ink in combination with a suitable carrier may be effective for this purpose and the sealing action may be accelerated by the application of heat.

In an alternative embodiment, the sealing step may be effected by application of a coating agent or medium to said surface portion of the slide or cassette so as to cover said organised array of printed data. Said printing medium and said coating agent or medium are preferably immiscible, so that said coating agent or medium may be applied to said surface portion of the slide or cassette while said organised array of printed data is wet without bleeding or distortion of the printed data occurring. It is especially favoured for the printing medium to be an aqueous-based ink and for the coating agent or medium to be a vinyl resin in combination with a carrier such as methyl isobutyl ketone or methyl ethyl ketone. The printing medium suitably comprises an aqueous-based ink in combination with one or more agents so that the ink may be used with an ink-jet printer. The method of the invention is especially advantageous in the application of information to a medical slide or histology cassette wherein the slide or cassette comprises an acetyl copolymer.

The invention also encompasses apparatus for applying information to a medical slide or histology cassette, the apparatus being characterised in it that comprises means for applying a printing medium directly onto a surface portion of a slide or cassette to define an organised array of printed data, the printing medium being sealable onto said surface portion of the slide or cassette so that said organised array of printed data is proof against removal or damage during subsequent handling or treatment of the slide or cassette.

The printing medium is preferably directly sealable onto said surface portion of the slide or cassette. In an alternative embodiment, the apparatus may comprise means for effecting sealing of said organised array of printed data onto said surface portion of the slide or cassette. The sealing means suitably applies a coating agent or medium to said surface portion of the slide or cassette so as to cover said organised array of printed data. In either embodiment, the sealing action may be enhanced by application of heat. In the alternative embodiment, sealing facilitated by the selection of a suitable fluid carrier to facilitate flow of the sealant to effect the required coverage of the area of printed data.

The printing means suitably comprises an ink-jet printer.

According to the invention in a more particular aspect, which may represent also a specific realisation of the apparatus for applying information to a medical slide or histology cassette as recited above, there is provided apparatus for printing data onto a medical slide or histology cassette comprising:

(a) storage means for holding a multiplicity of slides onto which data is to be printed, (b) storage means for holding a multiplicity of cassettes onto which data is to be printed, (c) a printing station for applying data to a selected slide, (d) a printing station for applying data to a selected cassette, (e) transport means for conveying a slide onto which data is to be printed from the slide storage means to the slide printing station and for conveying a slide onto which data has been printed from the slide printing station to a slide discharge location, (f) transport means for conveying a cassette onto which data is to be printed from the cassette storage means to the cassette printing station and for conveying a cassette onto which data has been printed from the cassette printing station to a cassette discharge location, (g) means for selectively enabling conveyance of a slide or a cassette from the respective storage means to the respective discharge location, and (h) means for enabling input of data to be printed onto a selected slide or cassette during said conveyance.

Each storage means preferably has a plurality of compartments for respective accommodation of slides or cassettes, in a favoured construction, six compartments. Each storage means is suitably of generally cylindrical configuration and is mounted for rotation about a substantially vertical axis so that each compartment is selectively alignable with a respective transport means for selective conveyance of a slide or cassette. The apparatus is provided with drive means for the storage arrangements, such as respective stepper motors for respective rotation of the storage means between a series of positions of alignment with the respective transport means. In a favoured construction, a sensor is provided for detecting alignment of an empty compartment of a respective storage means with the respective transport means and for initiating rotation of the storage means to align a loaded compartment of the storage means with the respective transport means.

Each transport means may comprise at least one belt disposed for pick-up of a slide or a cassette from the respective storage means and driving movement of the slide or cassette to the respective discharge location. In a preferred arrangement, each transport means comprises two belts. Suitably, each belt is provided with at least one protrusion for engagement of a slide or cassette at the respective storage means for said pick-up and driving movement of the slide or cassette. Each belt is preferably mounted about respective pulleys located respectively in the vicinity of the respective storage means and the respective discharge location. In a favoured construction, drive arrangements such as respective stepper motors are provided for drive of the respective transport means.

A first feature of the printing system provided by the invention thus includes slide and cassette storage devices, and a respective associated transport apparatus for slides or cassettes. The storage devices are removably securable to respective shafts located in the region of an end of the respective transport apparatus. Each transport apparatus or system provides for transport of slides or cassettes to a second feature of the invention, described below.

In the apparatus according to the invention, the respective printing stations are suitably located adjacent to the path of travel of a slide or cassette during conveyance of the slide or cassette by the respective transport means. The slide printing station preferably comprises a print head located above or below the path of travel of the slide, while the cassette printing station may comprise a print head located to one side of the path of travel of the cassette. The apparatus optionally further comprises a coating station for dispensing a coating medium to the region of a slide or cassette onto which data has been printed, the coating station preferably providing for capillary communication of coating medium to said region of a slide or cassette. Means for dispensing coating medium to said coating station in controlled predetermined quantities are also present in a variant of the invention.

A second feature of the system or apparatus of the invention thus includes inkjet print heads mounted for association with the respective transport apparatus or system. As a slide passes the printer or print head, data that has been entered into the printing system as a whole is printed onto an end region of the slide, for example, a frosted or polymer-coated end region, on the downwardly directed side of the slide. Similarly, as a cassette is removed from the respective cassette storage unit and transported along by the cassette transport apparatus or system, it passes in front of a second inkjet print head and data is printed onto the front edge of the cassette, i.e. an edge region of the cassette directed towards the side of the path of cassette movement.

This second feature may also provide for passage of the slide, after printing, over a platen also mounted for association with the slide apparatus or system. This platen coating dispenses a coating agent or medium in the form of a liquid to the underside of the slide. As the slide passes over this platen, a thin film of this coating agent is applied, covering the printed area. Similarly, a cassette is treated in the same manner on the cassette transport apparatus, by application of coating medium or agent over the printing or printed area.

The apparatus according to the invention may further comprise respective heating stations for effecting a solidifying or drying action on coating medium applied to a region of a slide or cassette onto which data has been printed. In a favoured arrangement, heating is effected by circulation of warm air.

Each discharge location of the apparatus of the invention may be provided with a respective slide or cassette collecting arrangement for respective accommodation of a multiplicity of slides or cassettes onto which data has been printed. In a favoured arrangement, said collecting arrangement comprises respective slide and cassette racks, each rack having a multiplicity of slots for reception of slides or cassettes. An indexing mechanism may be provided for displacement of each rack by one slot according as a slot is occupied by a slide or cassette, and the apparatus may also include sensors for detecting occupation of a slot of the collecting arrangement by a slide or cassette and for initiating an indexing movement of the respective rack to align an unoccupied slot for reception of a subsequent slide or cassette.

A third but optional feature of the invention is therefore a heater station, for example, a warm air delivery feature, fitted into or positioned for association with each of the transport mechanisms, to allow the slide or cassette to be dried prior to placing the item (i.e. slide or cassette) into a storage or collection rack at the end of the process. The storage or collection rack provides a dual system to allow for storing and collecting both slides and cassettes. The storage or collecting rack has a series of slots allowing for the positioning of a single microscope slide or cassette into each slot of the respective slide or cassette storage or collecting arrangement. The respective slide or cassette accommodating portion of the storage rack is incremented upwards in a vertical direction after each slide or cassette item has been placed into it, allowing for the next item to be loaded as it is finished. This process continues until the slide or cassette rack portion is full, at which time the operator removes a full rack and replaces it with an empty one so as to be able to continue the process.

The apparatus of the invention suitably also comprises a control system having a multiplicity of sensors for detecting progressive movement of slides or cassettes through the apparatus, and for initiating and terminating drive of the transport means and actuating printing and optionally other processing steps in response to signals from said sensors. Conveyance of a slide or cassette from the respective storage means to the respective discharge location may be effected at varying speed in accordance with the location of the slide or cassette on its path of travel between the storage means and the discharge location. Finally, the apparatus of the invention suitably comprises a display for indicating data to be printed onto a slide or cassette, and optionally other parameters of operation.

The aforementioned text has outlined some of the more pertinent features and advantages of the invention. These features are to be construed to be merely illustrative of some of the more prominent features and applications of the present invention. Many other beneficial results may be obtained by applying the invention in a different manner or by modifying the invention within the scope of the present disclosure. Accordingly, other objects and a fuller understanding of the invention may be gained by referring to the detailed description of the preferred embodiments in conjunction with the accompanying drawings, the scope of the invention being however defined only by the claims.

DETAILED DESCRIPTION OF THE DRAWINGS

Figure 1:
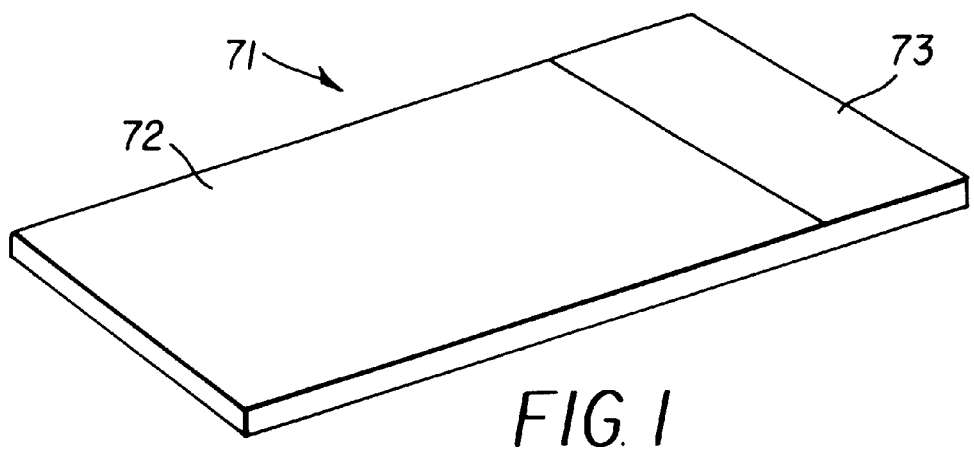
FIG. 1 is a pictorial and generalised view of a microscope slide to be printed in a system according to the present invention.

FIG. 1 shows a pictorial representation of a substantially standard microscope slide 71 having a region 72 within which the specimen to be examined is enclosed and an end region 73 to which identification of the specimen may be applied. End region 73 may be frosted, but this is optional. Alternatively, and more usually, the end region 73 is covered by a polymer coating, suitable a fluoropolymer. This coated end region serves to allow data to be written onto the slide, at present typically using a pencil or the like. The polymer coating may have no colour, i.e. be of a neutral, generally white coloration, or it may have a specific coloration, e.g. red, green etc. Colour coding of this kind is used by many institutions to differentiate between diverse types or groups of slides. Slides of this kind are entirely conventional and have also been provided in a diversity of modified arrangements, in order to deal with the problem of affixing identification to the end region 73 of the slide 71, which is reserved for this purpose. The slide 71 has generally substantially standardised elongate and transverse dimensions, and is relatively thin with respect to its other dimensions.

Figure 2:
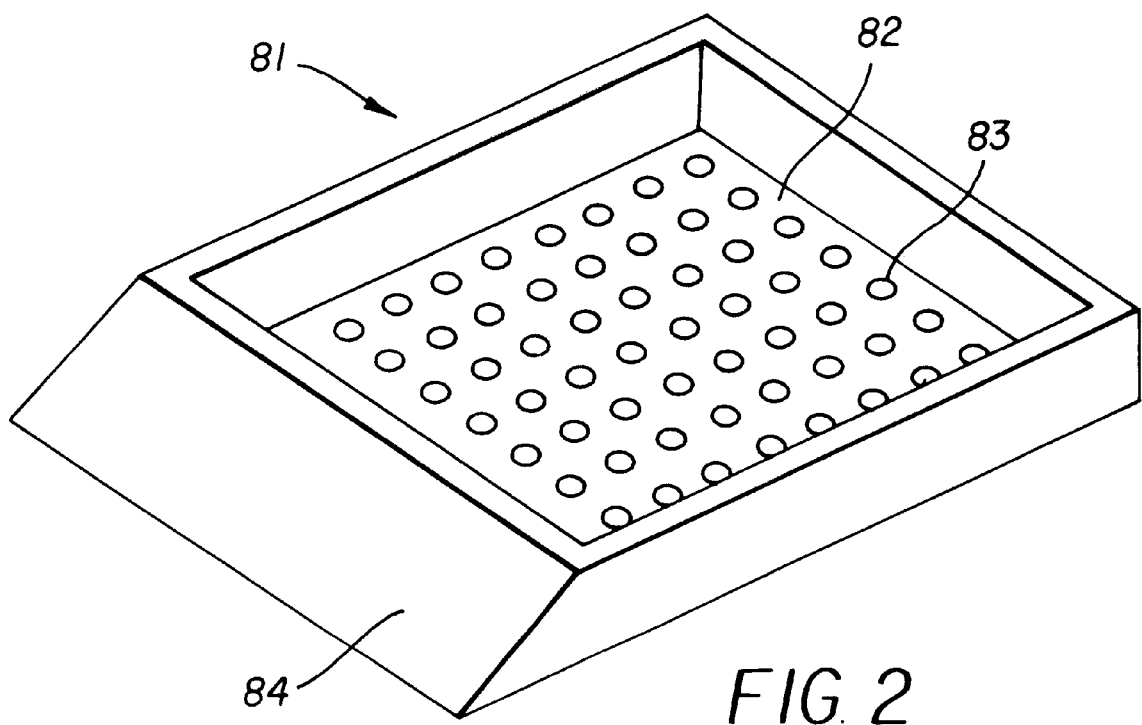
FIG. 2 is a pictorial and generalised view of a histology cassette for use in a printing system according to the present invention.

FIG. 2 is a pictorial representation of a cassette 81 for use in holding histological samples. As shown, cassette 81 is of rectangular shape. As compared with the slide 71 of FIG. 1, the cassette 81 has a significant thickness dimension relative to its side dimensions. Histological samples are encapsulated in paraffin wax and held in the cassette, in a recessed sample region 82, for selective retrieval as required for use in preparing slide material. Holes 84 are suitably provided in a substantially uniform array in the base of the cassette 81, at the bottom of the recessed sample region 82, to aid the embedding or potting process, by allowing flow-through of paraffin wax. A solidified sample may be extracted from the cassette 81 as required for use and analysis, and may be subsequently replaced in the cassette, if appropriate.

As compared with the slide 71, information or identifying indicia are generally provided on a sloping end or side face of the cassette 81. In the case of FIG. 2, such information is provided on the face indicated by reference 83. Cassettes of this type are manufactured from an acetyl polymer.

Figure 3:
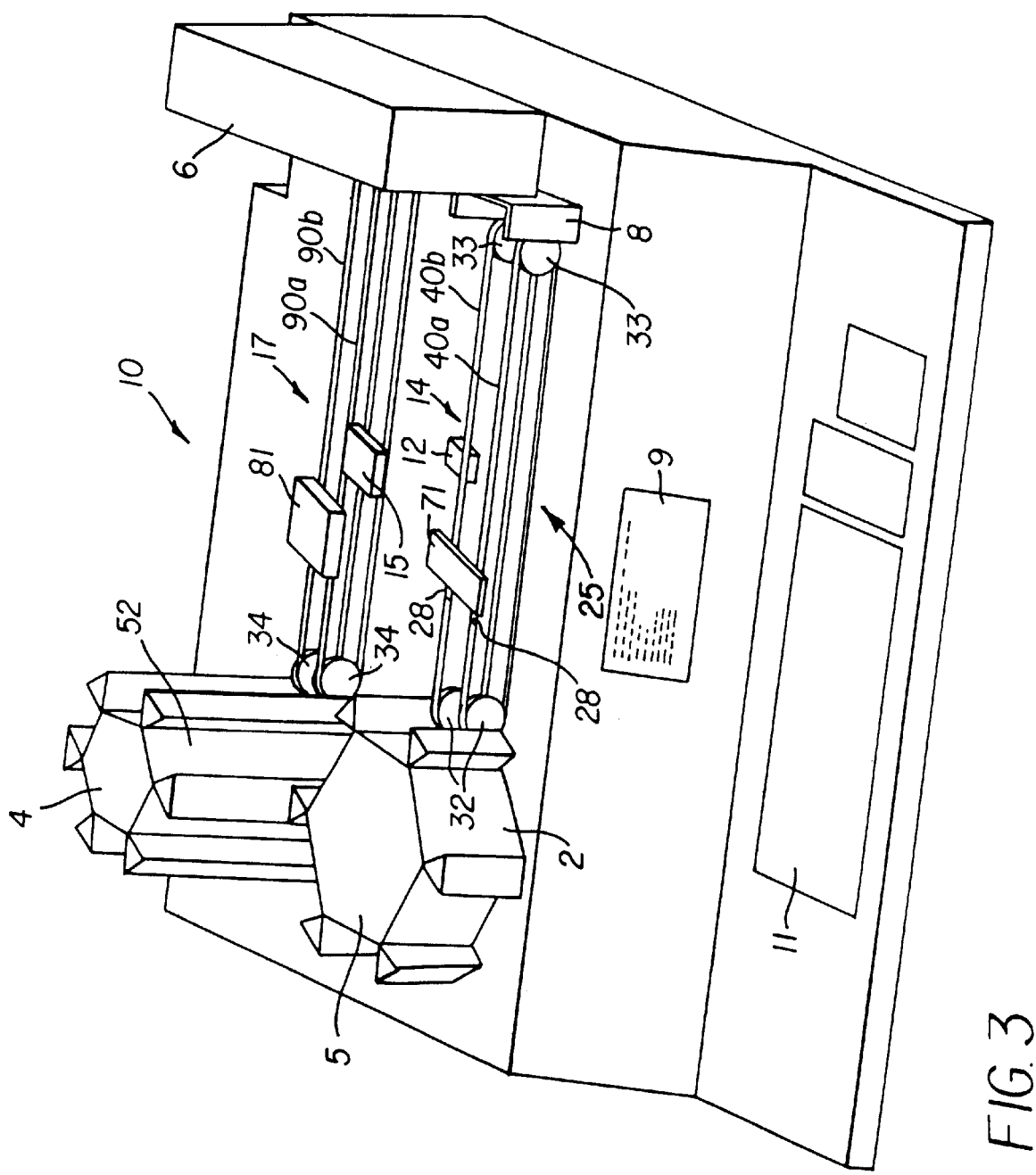
FIG. 3 is a pictorial view of a microscope slide and histology cassette printer system according to a first embodiment of the present invention.
Figure 4:
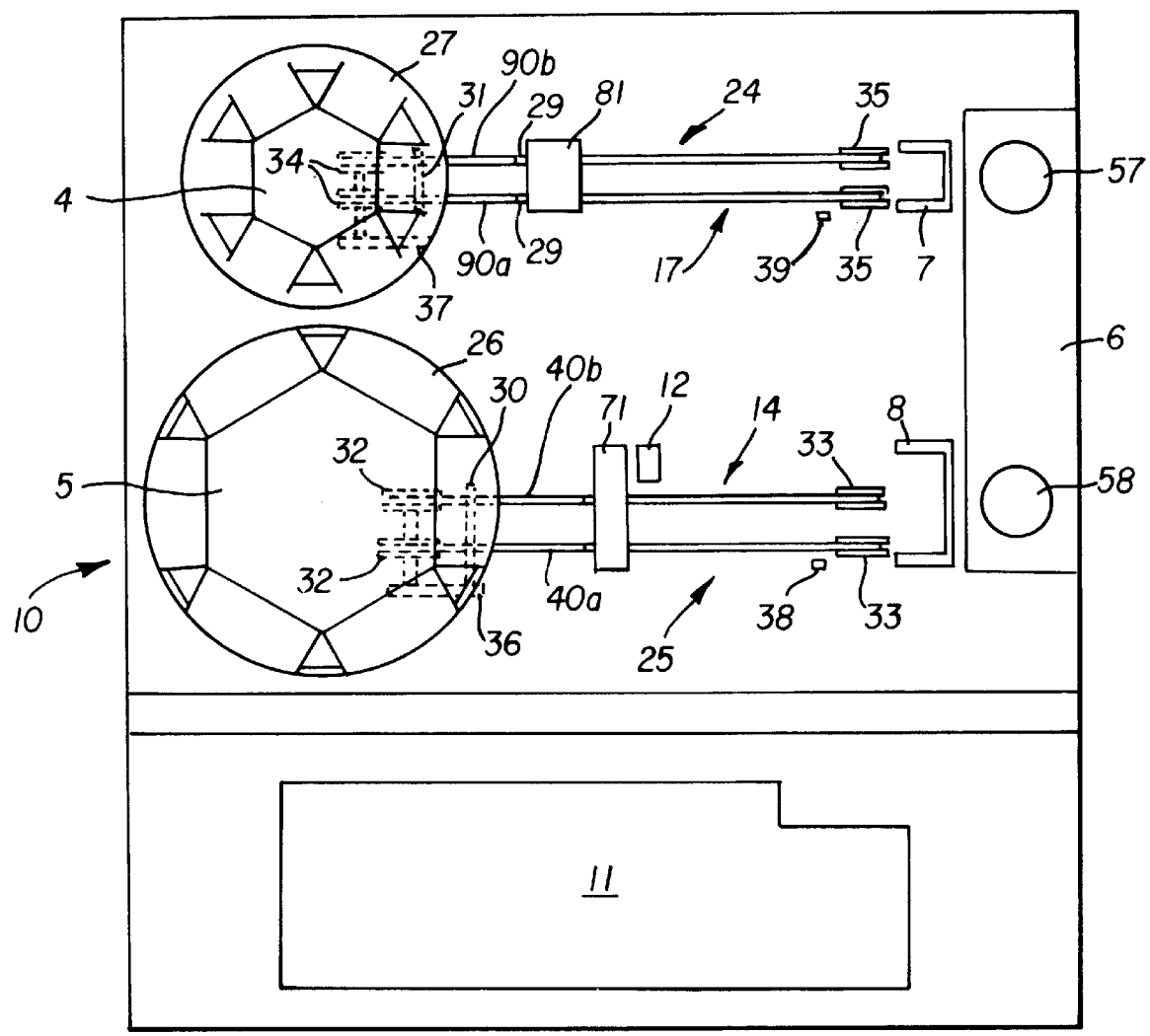
FIG. 4 is a top view of the microscope slide and histology cassette printer system of FIG. 3.

FIGS. 3 and 4 illustrate the various features of a microscope slide and cassette printer system in accordance with a first embodiment of the present invention. As seen in these drawings, the automated printer 10 for microscope slides and histology cassettes has two storage devices, a slide storage device 5 and a cassette storage device 4, two transport systems, one 25 for slides and one 24 for cassettes, two printing stations, one 12 for slides and one 15 for cassettes, and a collection rack 6 with two separate collection trays, one 8 for slides and one 7 for cassettes.

The overall structure which is shown in exposed condition in FIG. 3 is covered over by a cover portion of the unit 10, in use of the system. The cover is easily removable to facilitate insertion and retrieval of slides and cassettes. FIGS. 3 and 4 do not show structural features providing support and mounting for the various active elements of the invention, but these may be understood to be comprised at suitable locations within the system or printer 10 in conventional manner. Essentially, the structure as shown in FIGS. 3 and 4 provides two tracks for respective transfer of slides and cassettes from respective input stations to respective outlet or collection stations.

Slides in accordance with FIG. 1 are loaded into the slide storage device 5. The slide storage device 5 is removably secured to a shaft of a first slide drive motor (stepper motor) 26. The diameter of the stepper motor 26 substantially equates to the overall transverse dimension of the slide storage device 5, as will be apparent from FIG. 4 in particular. Once the machine 10 is activated, the first slide drive stepper motor 26 is activated to provide for rotation of the shaft to which the slide storage device 5 is securable. The slides are then individually discharged onto the slide transport system 25 in order to be printed and transported onwards for final placement in slide collection rack tray 8.

The slide carousel or storage arrangement 5 holds six stacks of fifty slides each. The slides may be of different colours, as typically different sections of a laboratory may use different colours to colour code or distinguish their slides. Similarly different pathologists may use different colours. Slides of different colours may be stacked in different segments or compartments 2 of the carousel 5. The printer 10 may be used to label slides all of the same colour, drawing slides from a single compartment 2 of the carousel 5, or slides of different colours may be selected for labelling in any desired order.

Slides do not carry specimens at the time of labelling and are labelled before specimens are subsequently associated with them. Slides may be taken selectively, for example, and at the operator's option, from another compartment, before a compartment is empty, e.g. as required to meet a specific coloration need.

Figure 5:
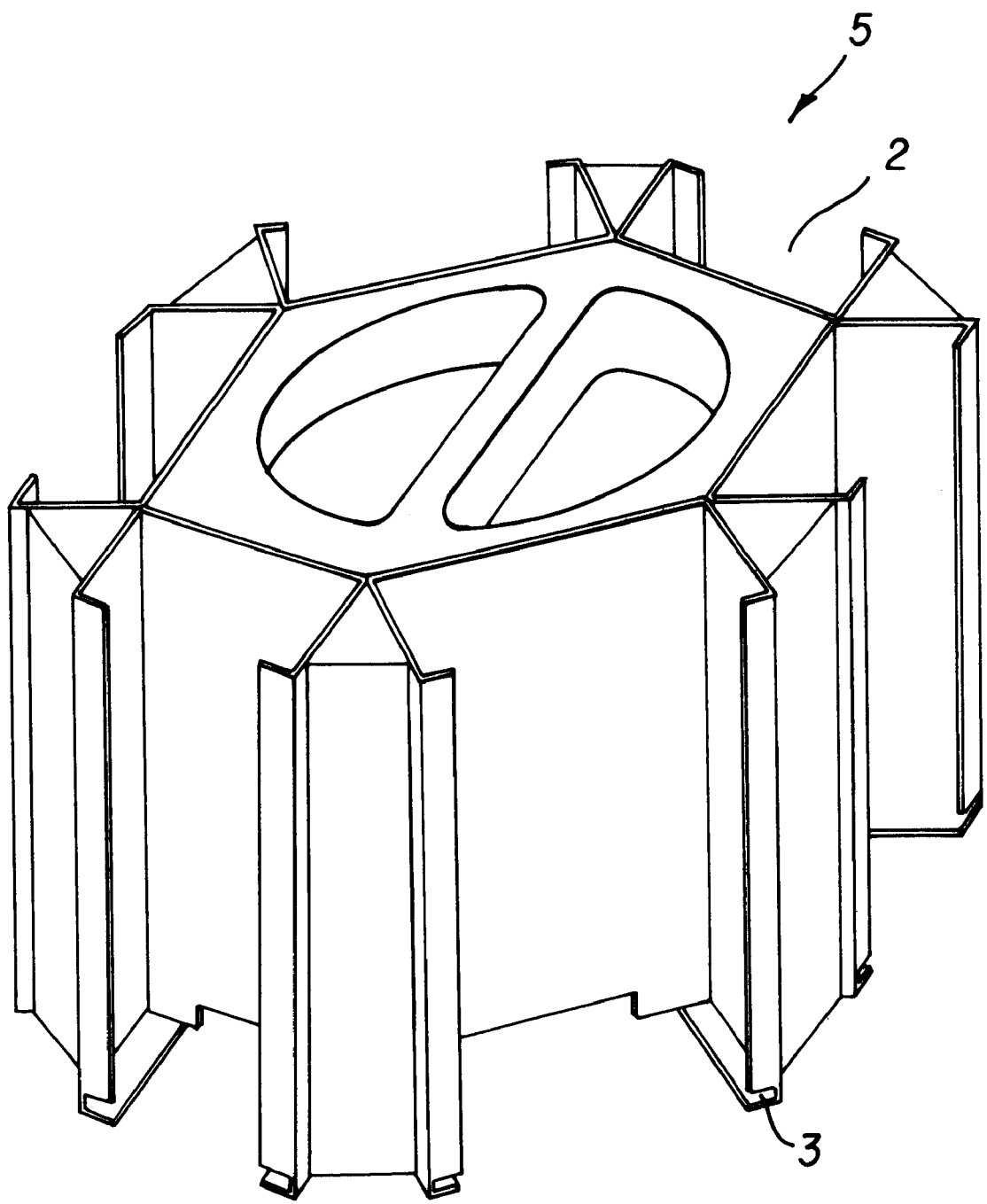
FIG. 5 is a pictorial view of a slide storage hopper used in the system of FIG. 3.

The slide storage device 5 as illustrated in these drawings, and in further detail in FIG. 5, is of six-sided construction. The storage device is broadly cylindrical in shape, with a hexagonal outline in top-view. It is rotatable about a vertical axis. There are six compartments for accommodating slides, each facing onto one of the six sides of the carousel. Each compartment 2 can accommodate fifty slides for subsequent individual transfer to the transport apparatus. The slide storage device 5 is rotated so that one of the six compartments 2 is in line with the slide transport apparatus 25. As belts 40a, 40b of the transport apparatus 25 move, a single slide is received by the transport apparatus and removed from the base of the storage device 5 through slot 3. This process continues until the compartment 2 is empty. A sensor 30, suitably an optical sensor, in electrical communication with a microprocessor of the system detects when a compartment 2 is empty and instructs the motor 26, by way of the microprocessor, to turn the slide storage device 5 to the next compartment 2. Alternatively, a slide may be selected from a different compartment, for example, if a different colour is required. If a particular compartment is empty, interlocks and logic arrangements provide for automatic rotation of the carousel to the next compartment having slides of the required coloration.

Cassettes in accordance with FIG. 2 are similarly loaded into the cassette storage device 4. The cassette storage carousel is constructed to be generally similar to the slide store, but is dimensionally different, because of the different shape and size of cassettes as compared with slides. Its principle of operation is however substantially the same. The cassette storage device 4 is removably secured to a shaft of a first cassette drive motor (stepper motor) 27. As in the case of the stepper motor for the slide carousel, the stepper motor for the cassette carousel is likewise of a diameter which substantially equates to the maximum transverse dimension of the cassette carousel. This feature of the structure will be apparent from FIG. 4. Once the machine 10 is activated, the first cassette drive stepper motor 27 is activated to provide for rotation of the shaft to which the cassette storage device 4 is securable. The cassettes are then individually discharged onto the cassette transport system 24 in order to be printed and transported onwards for final placement in cassette collection rack tray 7.

Figure 6:
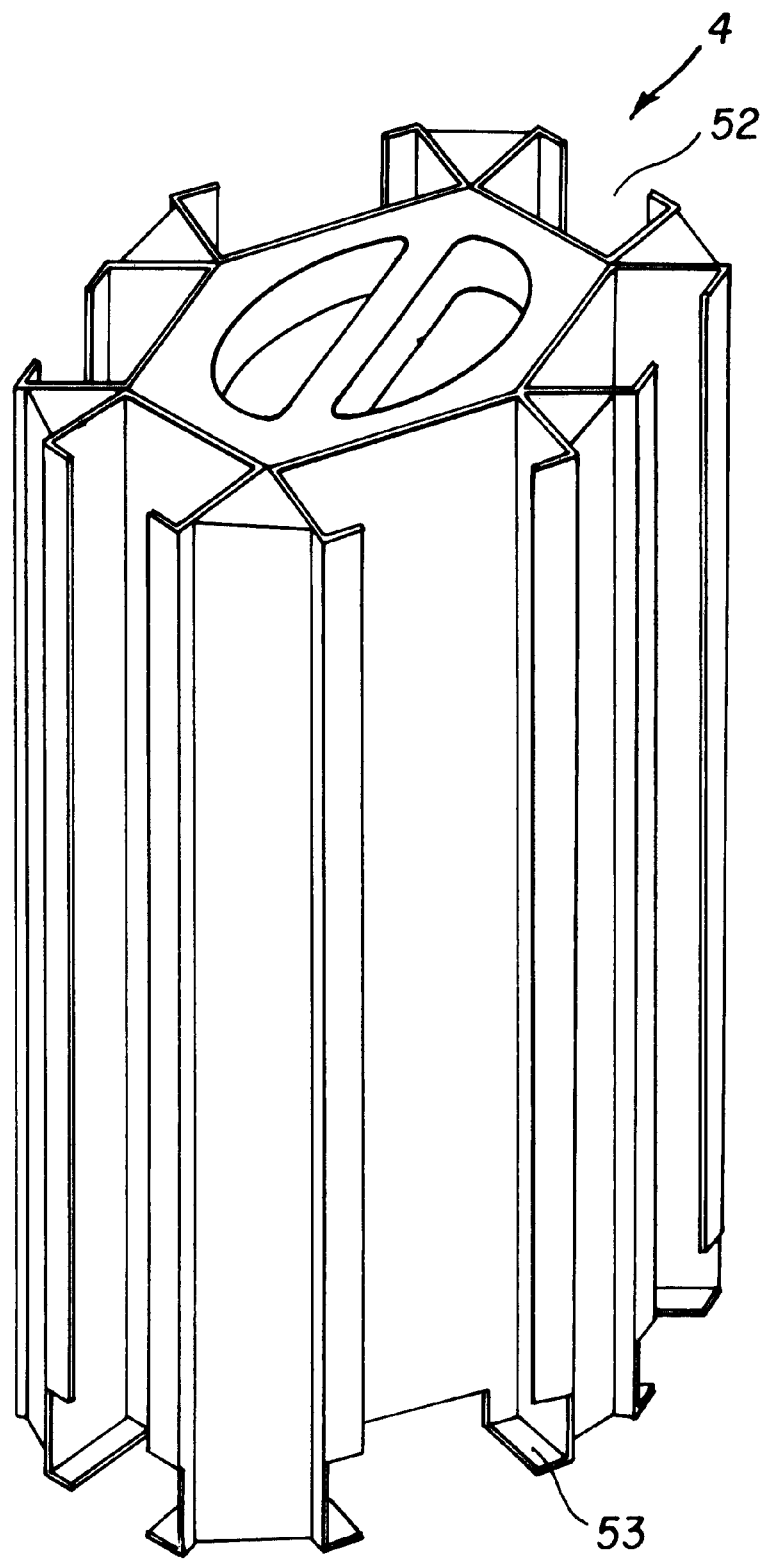
FIG. 6 is a pictorial view of a cassette storage hopper used in the system of FIG. 3.

The cassette storage device as illustrated in these drawings, and in further detail in FIG. 6, is of six-sided construction. Each compartment 52 can accommodate twenty-five cassettes. The cassette storage device 4 is rotated so that one of the six compartments 52 is in line with the cassette transport apparatus 24. As belts 90a, 90b of the transport apparatus move, a single cassette is removed from the base of the storage device 4 through slot 53. This process continues until the compartment 52 is empty. A sensor 31 in electrical communication with the microprocessor of the system detects when a compartment 52 is empty and instructs the motor 27 to turn the cassette storage device 4 to the next compartment 52. If the entire carousel is empty, an alert is similarly activated, calling the operator to load a fresh carousel or recharge the carousel with a new supply of blank slides or cassettes. A similar alert applies when the slide carousel becomes empty.

The slides or cassettes are released one at a time from their respective storage devices 5, 4 and onto their respective slide transport systems 25, 24.

The slide transport system 25 includes a pair of belts 40a, 40b parallel to each other and spaced apart to provide for movement of the slides 71 along the transport mechanism 25. The belts 40a, 40b are moved by a stepper motor 36 at a variable rate along the transport mechanism 25. The drive speed of the belts is varied depending on slide location, changing from a predetermined first value for transport of the slide towards and away from the printing station of the apparatus to a reduced value during the passage of a slide past the printing station. A particularly reduced drive speed also prevails during slide removal from the carousel, in order to ensure successful pick-up of the slide by the belts.

Each of these conveyor belts 40a, 40b extends around a respective first pulley 32 and a respective second pulley 33. Each first pulley 32 is located at the start of the transport mechanism 25 and to the rear of the slide storage device 5. Each second pulley 33 is located at the opposite end of the transport mechanism 25.

Each conveyor belt 40a, 40b has a respective set of evenly spaced profiles 28 or pips. The profiles or pips 28 define upstanding projections on the upper run of each belt 40a, 40b, i.e. the slide-advancing runs of the belts 40a, 40b. The profiles 28 are arranged to protrude vertically above and beyond the upper surface of the transport mechanism 25 defined by the upper surfaces of the upper runs of the belts. The respective profiles 28 on the two belts 40a, 40b are aligned so that each pair or set of belt profiles 28 moves one slide 71 from the slide storage device 5 to the rack slide collection tray 8. The slide 71 is pushed out of the slide storage device 5 by the pair of belt profiles 28, the slide 71 being thereby horizontally released from the storage device 5 for travel along the transport mechanism 25 in a substantially horizontal disposition. During this travel, the slide is brought into the correct or appropriate positions for printing and subsequent drying of the printed-on matter.

Figure 7:
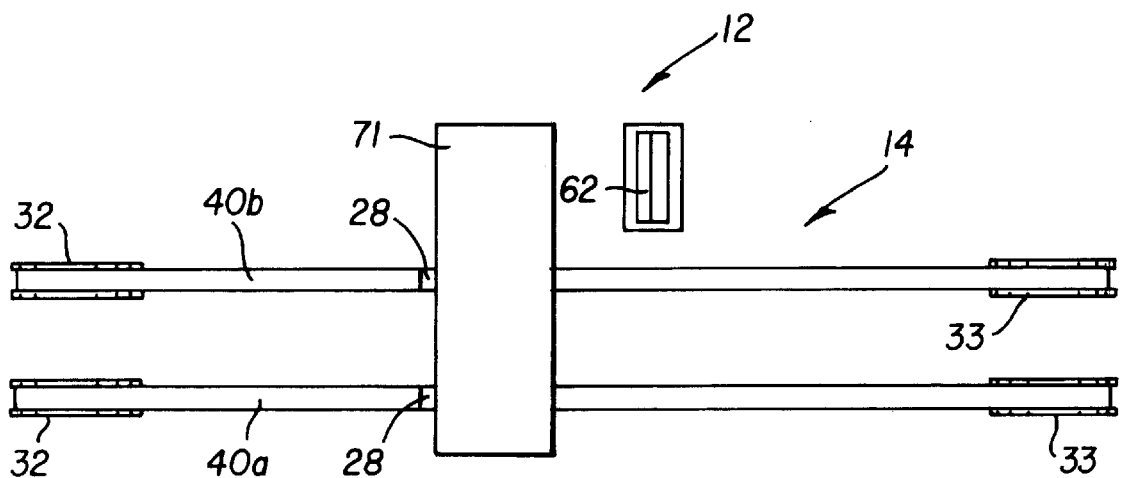
FIG. 7 is a top view of a fluid application station used for slides in the processing section of the system of FIG. 3.

While travelling along the transport mechanism 25, the slide 71 passes over an ink jet print head 62 (illustrated in FIG. 7), which prints on the slide 71, on its lower or downwardly directed side or face region 73, data which may be entered by an operator via keyboard 11. Keyboard 11 is in communication with the microprocessor of the machine 10. The slide print head may apply up to five lines of print on a slide 71. Data entry may alternatively be effected from a bar code reader, rather than a keyboard. As a further option, the apparatus 10 of the invention may be linked to the mainframe computer of a hospital, or to any other relevant data source, e.g. a floppy disk bearing pre-prepared data. The print head provides a line of jet orifices in linear array and the axis of the linear array is aligned diagonally, at an angle to the direction of travel of the slide. Co-ordination of slide travel speed and printing action ensures clean and legible application of data to the slide. In a variant, the printed matter may itself be in the form of a bar code.

All data is applied to clean glass slides and clean cassettes, before specimens are associated with them.

In order to facilitate the provision of a good quality of print, the slide is steadied on the side directed away from the print head during its passage over the print head. This steadying action is effected by suitable resilient means, such as a foam rubber pad, bearing against the non-printing side of the slide. The steadying action addresses any possible instabilities arising out of the slightly jerky movement of the belts resulting from the use of the stepper motor drive. The steadying is further facilitated by the drive speed being reduced during the printing step.

The printed slide 71 moves further along the transport mechanism 25 to an optional heating station 14 where drying of the printed matter on the slide may be further stimulated. The heating action is suitably effected by a warm airflow, the dried printed matter then being sealed to the slide and resistant to chemical attack. It may be emphasized that the drying step and heating station are optional and are not necessarily required in every realisation of the system of the invention.

The slide 71 is finally pushed into the collection tray 8, situated in the collection rack 6. The belts 40a, 40b continue to move after they have released the slide 71 and rotate around the pullies 33 to a location where there is an optical sensor 38 adjacent to the lower run of the belts to detect the passage of the profile 28 on one of the belts 40a, 40b. This sensor 38 is in electrical communication with the microprocessor. Detection of the profile 28 by the sensor 38 results in an instruction to the belt drive motor 36 to stop.

Sensors, preferably optical sensors, are also located at suitably a plurality of locations along the path of travel of the slide to detect proximity of the slide to the printing station and to initiate appropriate action, viz. change of drive speed and printing operations at the print head. These sensors are in communication with the microprocessor of the apparatus to enable suitable commands to be directed to the printing station for timely operation in correct sequence.

Actuation of the sensor 38 is also used to initiate an instruction from the microprocessor to increment the collection tray 8 in an upward vertical direction.

The cassette transport system 24 includes a pair of belts 90a, 90b parallel to each other and spaced apart to provide for movement of the cassettes along the transport mechanism 24. The belts 90a, 90b are moved by a stepper motor 37 along the transport mechanism 24. The speed of travel is varied along the path of transport depending on the requirements of each stage of the printing operation.

Each of these conveyor belts 90a, 90b extends around a respective first pulley 34 and a respective second pulley 35. Each first pulley 34 is located at the start of the transport mechanism 24 and to the rear of the cassette storage device 4. Each second pulley 35 is located at the opposite end of the transport mechanism 24.

Each conveyor belt 90a, 90b has a respective set of evenly spaced profiles 29 or pips. The profiles or pips 29 define upstanding projections on the upper run of each belt 90a, 90b, i.e. the cassette-advancing runs of the belts 90a, 90b. The profiles 29 are arranged to protrude vertically above and beyond the static upper surface of the transport mechanism 24, again as defined by the upper surfaces of the upper runs of the belts. The respective profiles 29 on the two belts 90a, 90b are aligned so that each pair or set of belt profiles 29 moves one cassette 81 from the cassette storage device 4 to the rack cassette collection tray 7. The cassette 81 is pushed out of the cassette storage device 4 by the pair of belt profiles 29, the cassette 81 being thereby horizontally released from the storage device 4 for travel along the transport mechanism 24 in a substantially horizontal disposition. During this travel, the cassette is brought into the correct or appropriate positions for printing and subsequent drying of the printed-on matter.

Figure 8:
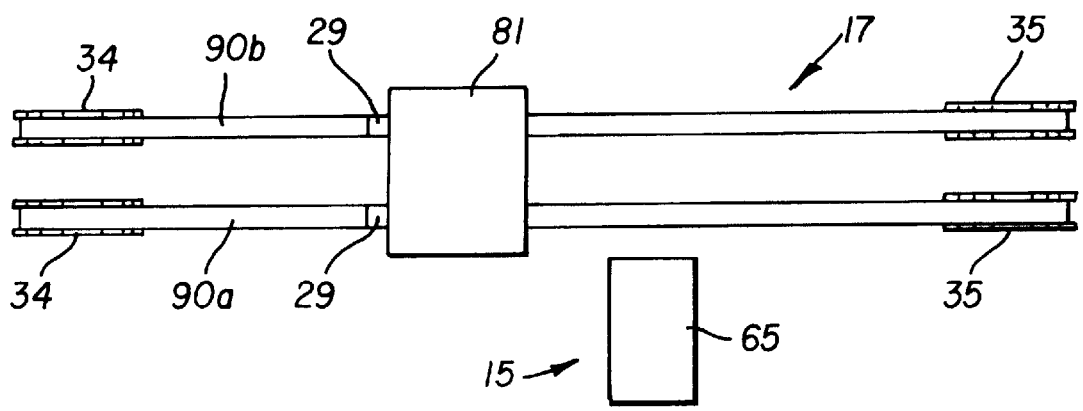
FIG. 8 is a top view of a fluid application station used for cassettes in the system of FIG. 3.

While travelling along the transport mechanism 24, the cassette 81 passes in front of an ink jet print head 65 (illustrated in FIG. 8) which prints onto the cassette 81, on its sloping end face 83 or printing region thereof, data entered by an operator via keyboard 11. Keyboard 11 is in communication with the microprocessor of the machine. The print head is oriented appropriately with respect to the cassette disposition to achieve the required data application or printing on the cassette.

Typically up to two lines of information are printed onto the sloping end face 83 of the cassette 81, and the information may again be provided not only by the keyboard, but alternatively by means of a bar code reader or direct link to other computer information source. In a further variant, the printed matter may itself be in the form of a bar code.

A steadying action similar to that applied to the slides is also effected in respect of cassettes at the cassette printing station, for example, by suitable resilient supporting means.

The printed cassette 81 continues further along the transport mechanism 24 to an optional heating station 17 for stimulation, if required, of the drying of the printed matter on the cassette 81. In a preferred construction, a single hot air blower serves to warm and dry both slides and cassettes. The heating and drying features as applicable to cassettes are once again optional, as for the slides.

As in the case of the slide, this optional heating of the cassette 81 is thus again effected by a warm air flow.

The cassette 81 is finally pushed into the collection tray 7, situated in the collection rack 6. The belts 90a, 90b continue to move after they have released the cassette 81 and rotate around the pullies 35 to a location where there is an optical sensor 39 adjacent to the lower run of the belts to detect the passage of the profile 29 on one of the belts 90a, 90b. This sensor 39 is in electrical communication with the microprocessor. Detection of the profile 29 by the sensor 39 results in an instruction to the belt drive motor 37 to stop.

Suitable sensors are associated with the path of cassette travel in the same manner as for the path of slide travel for execution of appropriate control actions.

Actuation of the sensor 39 is also used to initiate an instruction from the microprocessor to increment the collection tray 7 in an upward vertical direction.

Figure 9:
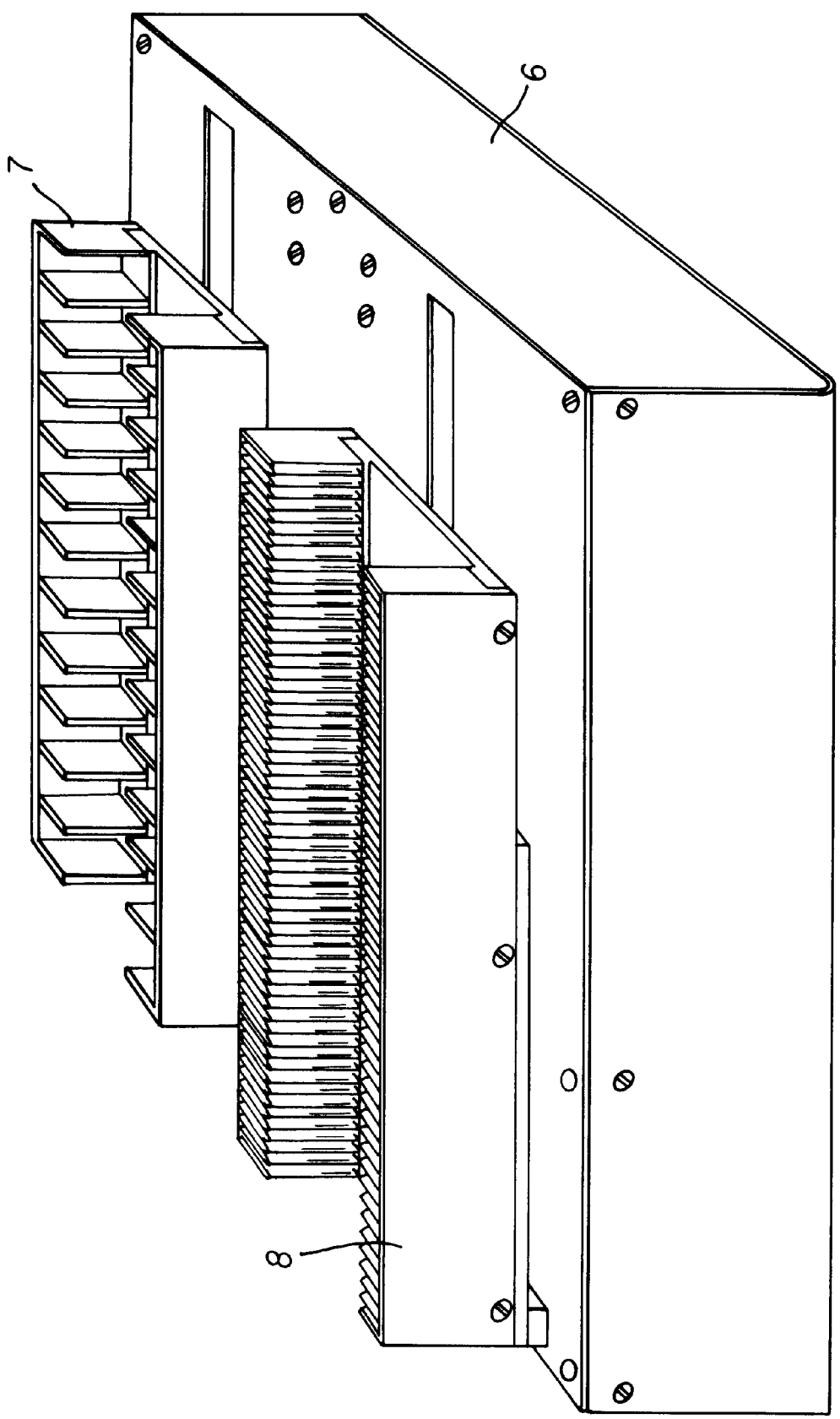
FIG. 9 is a perspective view of a rack-type slide and cassette collection system used in the system of FIG. 3.

FIG. 9 illustrates the rack storage or slide and cassette collection system 6. Each rack has equally-spaced slots or receptacles for capture of an individual slide or cassette respectively in each slot. The slide and cassette trays 7 and 8 respectively are removable from their backing plates 22. Internally mounted in the rack system 6 are two motors (stepper motors) 58 and 57 respectively, which drive two threaded shafts in rotation. As these threaded shafts rotate, the slide and cassette trays 8 and 7 respectively are moved up or down their entire length. Upward incrementing of the racks is effected by the respective stepper motor drive systems, which are in electrical communication with the microprocessor of the system for control purposes. As slides 71 and cassettes 81 are processed, the trays 7 and 8 are moved in an upward vertical direction one slot at a time so that slides and cassettes are loaded into and stored sequentially in the slots or receptacles of the collection rack. When a tray 7 or 8 is full and at its top position, i.e. at the end of its travel, a sensor, suitably an optical sensor, in communication with the microprocessor and positioned or arranged to detect this condition, initiates an audible warning to the operator that the relevant section of the rack 6 is full. The machine 10 will stop processing any more slides or cassettes until the operator intervenes to remove the full tray 7 or 8 and replace it with an empty one. The operator then also instructs the machine 10 via the keyboard 11 to restart. The rack system 6 is thereby also reset to the bottom position. The motors 57, 58 within rack 6 then turn in their reverse direction to lower the rack trays 7 or 8 to their bottom position. A further sensor detects when the bottom position is reached, i.e. when the rack is reset to its start position, and is in electrical connection with the microprocessor to indicate the respective operating condition. A further optical sensor mounted on or to the drive shaft of each rack detects each slot as the rack is moved in the vertical direction. This sensor is in direct communication with the microprocessor, to effect the required stopping of the drive system when alignment of an empty slot for reception of a slide or cassette is detected. When the slide or cassette is loaded, the rack is then actuated by way of the microprocessor to seek and align the next empty slot.

As illustrated in the various views of the automated printer (FIGS. 3 and 4), there is a liquid crystal display 9 mounted directly above the keyboard 11 and in direct view of the operator. This display 9 shows all of the information to be printed onto the microscope slides or the cassettes to be processed by the machine 10 on an individual basis for each slide or cassette. The display 9 also shows the various functions that may be set using the keyboard 11. The number of slides/cassettes to be printed or processed and the colour of the slides/cassettes to be printed may also be set by the operator using the keyboard. Suitably, various defaults are set up for use of the system at a particular location. The display is suitably also in electronic communication with the microprocessor of the apparatus to indicate the current status of the processing. Cycle time to print a slide or cassette is typically about 30 seconds. It may be noted that a slide and a cassette may be printed at the same time in parallel, i.e. each path can be used simultaneously. Five computing facilities are provided within the unit, four controlling various specific functions and actions, and the fifth acting as overall controlling microprocessor.

In the preferred embodiment of the invention described above, an ink is used which provides the requisite print quality in conjunction with suitable chemical resistance, without necessitating a separate protective coating. The preferred ink is solvent-based and uses a vinyl resin to impart the chemical resistance. Such a solvent-based ink enables the necessary print quality to be achieved, while also providing the required level of chemical resistance without the need for a protective overcoat.

The vinyl resin is incorporated into the solvent-based ink. A pigment is used as colorant to impart water and solvent fastness as well as a suitable level of lightfastness. Preferred solvents are lactate esters, which are safe from the viewpoints of toxicology and environment, as well as being biodegradable. A combination of different lactates enables an acceptably speedy drying time to be achieved, along with a reasonably extended dwell time in an idle printhead. With a particularly preferred ink formulation, drying time on both slides and cassettes can be reduced to seconds, especially in conjunction with optional use of a hot air flow.

Preferably viscosity is low, so that greater pigment and resin loading can be achieved. Pigment may constitute up to 50% of the weight of particulate matter in the ink. The pigment, when printed, is bound to the surface of the slide or cassette by the resin in solution, the pigment being as it were trapped in and surrounded by the resin.

An alternative embodiment of the invention will now be described having regard to FIGS. 10 to 13 inclusive, in which separate printing and sealing steps are provided, the printing being initially effected at a printing station and this being followed by a station at which a sealant medium is applied over the printed matter. The same reference numerals are used as apply to FIGS. 3 to 9 inclusive for features of this alternative embodiment which are identical with those of the preferred embodiment of FIGS. 3 to 9. Description of the common features of the preferred and alternative embodiments is also not repeated in the following text relating to FIGS. 10 to 13 inclusive.

Figure 10:
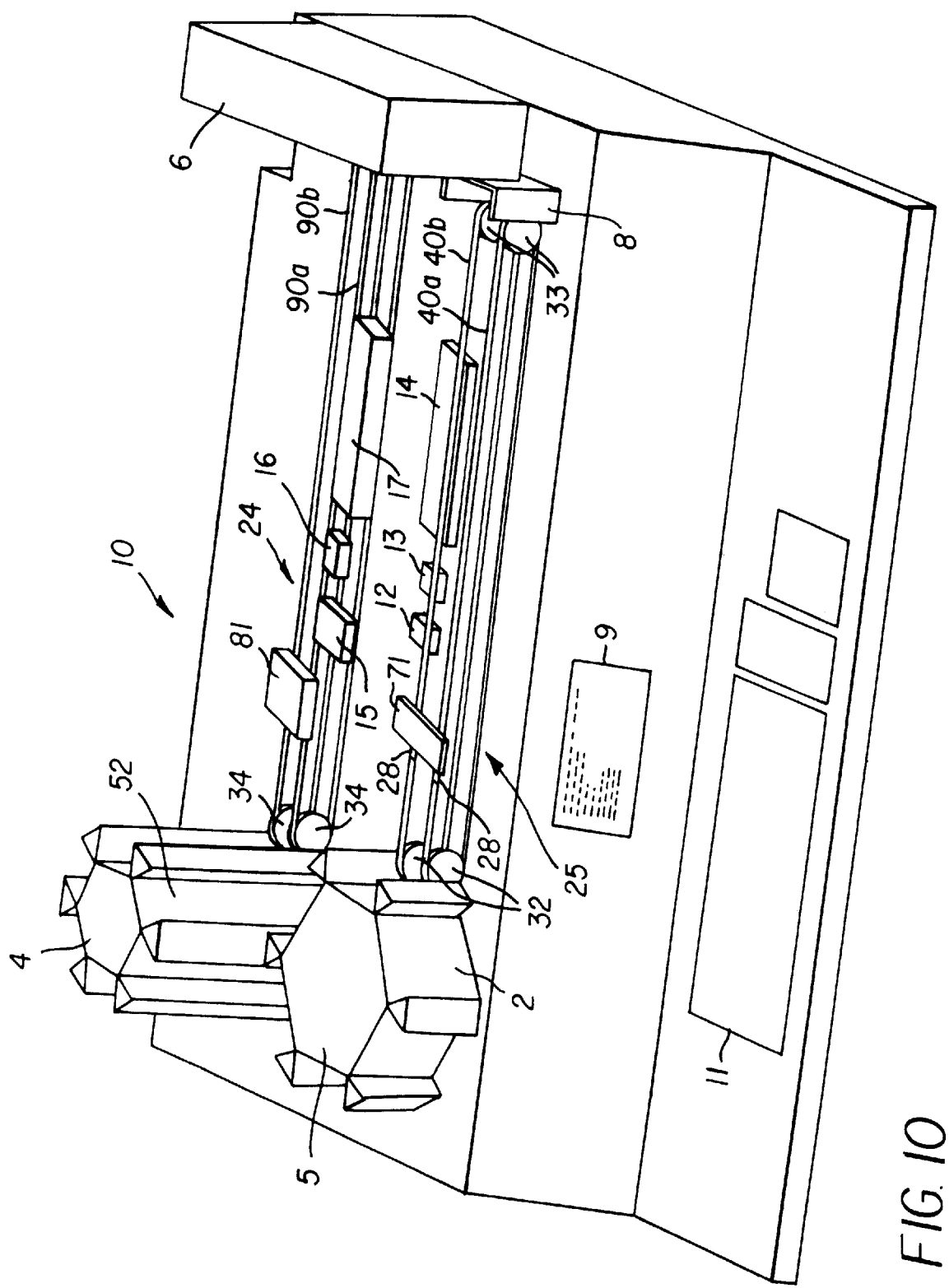
FIG. 10 is a pictorial view of a microscope slide and histology cassette printer system according to a second embodiment of the present invention.
Figure 11:
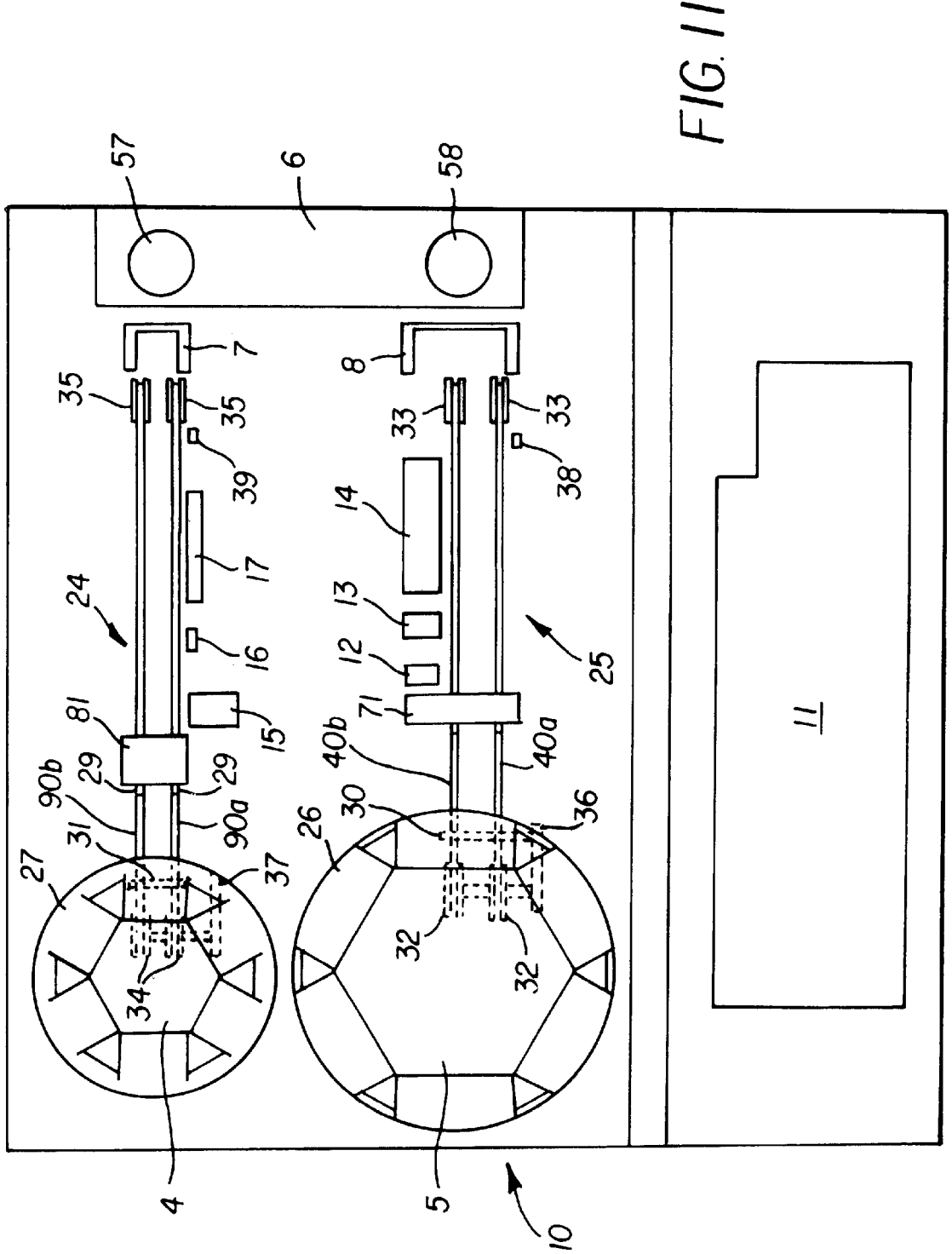
FIG. 11 is a top view of the microscope slide and histology cassette printer system of FIG. 10.

FIGS. 10 and 11 illustrate the various features of the microscope slide and cassette printer system of the present invention in an alternative embodiment. As seen in these drawings, the automated printer 10 for microscope slides and histology cassettes has two storage devices, a slide storage device 5 and a cassette storage device 4, two transport systems, one 25 for slides and one 24 for cassettes, two printing stations, one 12 for slides and one 15 for cassettes, two coating stations, one 13 for slides and one 16 for cassettes, two drying stations, one 14 for slides and one 17 for cassettes, and a collection rack 6 with two separate collection trays, one 8 for slides and one 7 for cassettes.

In this variant, the drive speed of the belts is again varied depending on slide location, changing from a predetermined first value for transport of the slide between stations of the apparatus to a reduced value during the passage of a slide past the printing and/or coating and drying stations.

Figure 12:
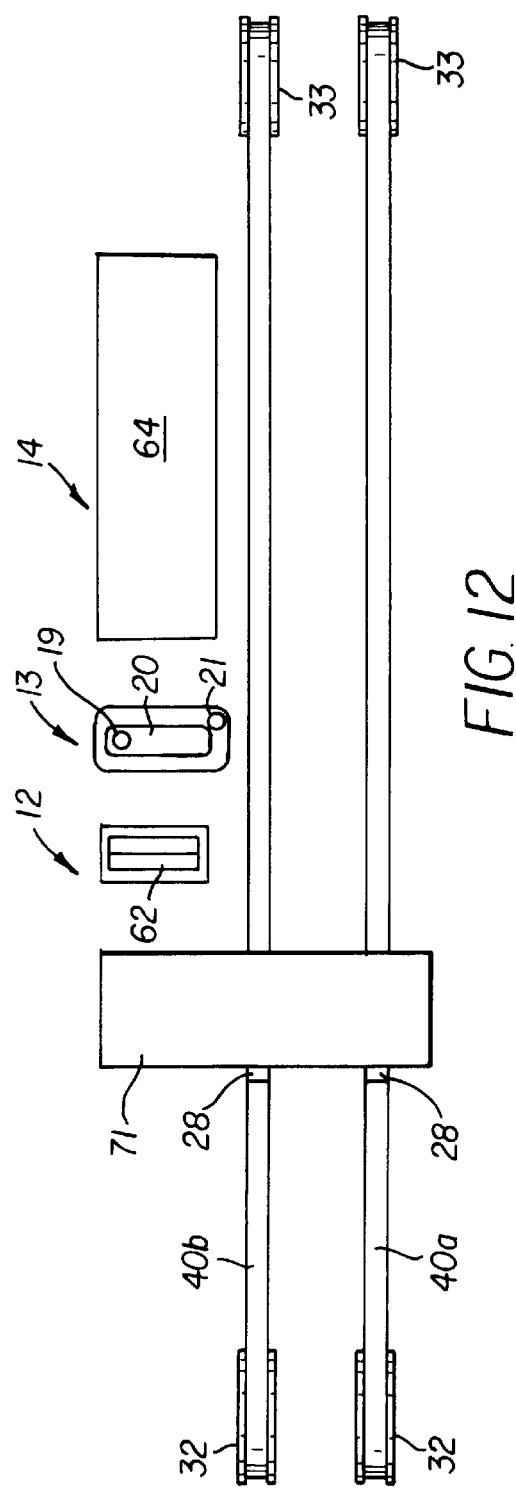
FIG. 12 is a top view of the slide print line of the system of FIG. 10.

Also in this variant of the invention, the printed slide 71 moves further along the transport mechanism 25 but now, during its further movement, passes over a platen 20 illustrated in FIG. 12. Optionally, a heating pad, not shown in the drawings, operating at 80° C., may be located between the printing head and the platen 20, to effect a partial drying action on the printed matter on the slide before it reaches the cooling or drying station, although this initial drying action is not essential. Platen 20 is arranged to be at a slightly lower level than the plane defined by the lower side of the slide, and, as the slide 71 passes over this coating station 13, a vinyl resin in the form of a liquid is dispensed via an orifice 19. The resin liquid flows across the platen 20 by means of capillary action and coats the printed surface of the slide 71 as it passes, i.e. the printed region on the underside of the slide, by capillary communication therewith. During this coating step, the coating agent spreads through the capillary gap between the slide and the coating head. Any excess liquid drains into wells at the side of the platen 20, and from there into a waste tank (not illustrated) via a drain hole 21. A thin layer of the vinyl resin is applied to the slide surface over the printing, thereby sealing the printing onto the slide. A storage container is provided for the coating agent and a pump provides for the dispensing of fluid from this container by way of an electrically-controlled valve to the coating station. The valve is regulated by the microprocessor to dispense an amount of fluid of correct or suitable volume to coat a slide. An alert arrangement notifies the operator when the waste tank is full and requires to be emptied.

Coating of the printed matter is required in this embodiment in order to protect the print against removal, either by physical contact or by the action of chemicals used to process the slides, or for similar processing of cassettes, as compared with the direct sealing of the printed matter or ink to the slide or cassette, as provided in the first embodiment.

The printed and coated slide 71 continues further along the transport mechanism 25 and passes over a heater 64 which stimulates drying of the flouropolymer coating on the slide 71. Thus the system has a succession of individual processing stations which are offset from the paths of travel between the slide and cassette storage and collection arrangements and are located or disposed in sequential manner for printing, coating and drying or heating of each individual slide or cassette, with variation in the speed of advance or drive of the cassettes or slides according as they move through each stage or station.

The heating action is suitably effected by a warm airflow, the fully dried coating then being resistant to chemical attack, as an alternative to the heater 64 illustrated. Remaining operations are completed as for the first or preferred embodiment.

Figure 13:
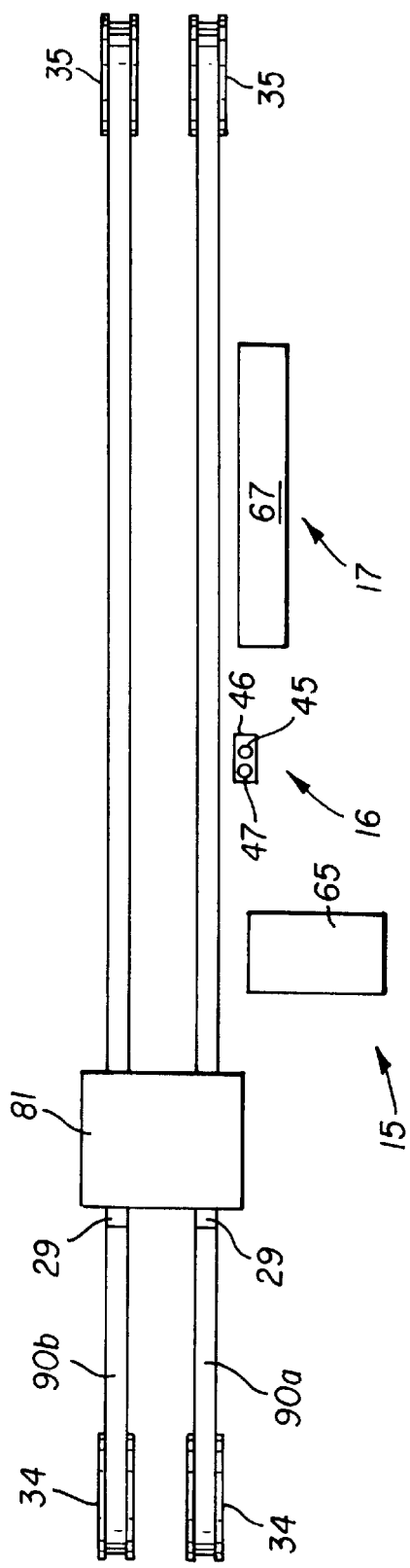
FIG. 13 is a top view of the cassette print line in the system of FIG. 10.

On the cassette printing line, the printed cassette 81 continues further along the transport mechanism 24 and passes in front of a platen 46 illustrated in FIG. 13. Platen 46 is arranged to be slightly spaced away from the sloping front surface 83 of the cassette 81, and, as the cassette passes in front of this coating station, a vinyl resin in the form of a liquid is dispensed via orifice 45. The liquid flows across the platen 46 by means of capillary action and coats the surface 83 of the cassette 81, i.e. the side face or sloping edge of the passing cassette, by capillary communication therewith, i.e. by capillary flow in the gap between the platen surface and the cassette printing face. Any excess liquid drains into wells at the side of the platen 46, and from there into the waste tank (not illustrated) via a drain hole 47. A thin layer of the vinyl resin is applied to the cassette surface over the printing, thereby sealing the printing onto the cassette. Similar dispensing arrangements apply as for the slide line or path of travel.

In the case of cassettes, it is particularly important for printed matter to be especially resistant to solutions, as cassettes are commonly held in a cleaning solution for up to twenty-four hours, to remove from a sample body fluids such as blood and the like. In this way, a sample is reduced to pure biological material only, before the separation of samples for use in slides.

The printed and coated cassette 81 continues further along the transport mechanism 24 and passes alongside a heater 67 which stimulates the drying of the vinyl resin coating on the cassette 81. In a preferred construction, a single hot air blower serves to warm and dry both slides and cassettes, as an alternative to the specifically cassette-related heater unit 67 illustrated. Again as for the slides, either form of heating is likewise also fully optional, as required.

As in the case of the slide, heating of the cassette 81 is thus again effected by a warm air flow. Remaining operations on the cassette line are as previously described.

As the coating medium used in this variant of the invention gives rise to the evolution of somewhat pungent fumes while drying, the upper region of the entire unit is preferably covered in this variant by a hinged closure, not shown, so as to define a fume region or cupboard during use of the apparatus, from which the fumes are withdrawn by a fan through an activated charcoal filter, before discharge to atmosphere.

In order to achieve successful printing and sealing of printed matter on cassettes of the type in question, and likewise to effect similar printing and sealing on slides of the type discussed herein, there is preferably used for the printing step in the foregoing variant of the invention, an aqueous-based ink which is then coated with an immiscible vinyl resin mixed with a MIBK (methyl isobutyl ketone). This coating does not mix with the ink but dries in its own right to provide a coating on both sides and cassettes which is not harmed by immersion in alcohol, xylene, stains or formalin, even at the highest temperature. The ink jet-printed data is thus sealed against attack during subsequent handling and processing of the slides or cassettes by the vinyl hydro-chloro-fluoro resin or polymer carried in the methyl isobutyl ketone. An alternative solvent or carrier for the resin is methy ethyl ketone (MEK), MIBK being however preferred because of its higher boiling point.

Application of the vinyl resin coating medium or agent to the printed matter while the ink is still wet can be effected without bleeding occurring. The two liquids are immiscible and the ink is not miscible in the coating agent. A vinyl resin in combination with MEK is available under the Trade Mark FluoroPel FCI 820 Clear from Cytonix of Beltsville, Md. 20705, USA.

The ink is adapted in known manner for use with an ink jet head. Ink jet print heads are sensitive to both the surface tension and the viscosity of the ink. For many industrial applications, an ink based fully on propylene glycol is used, the glycol serving as a thickening agent and increasing the viscosity by typically a factor of 10. Reduction of surface tension may be effected by addition of an alcohol, in particular a denatured alcohol. In the water-based ink preferred in the particular embodiment of the present invention described herein in respect of FIGS. 10 to 13, suitable thickening and surface tension-modifying additives are combined with the ink to give it the required ink jet printing capability or properties.

Thus, in summary, the aqueous ink provides the print quality and is used in conjunction with the protective coating to deliver the chemical resistance.

Figure 14:
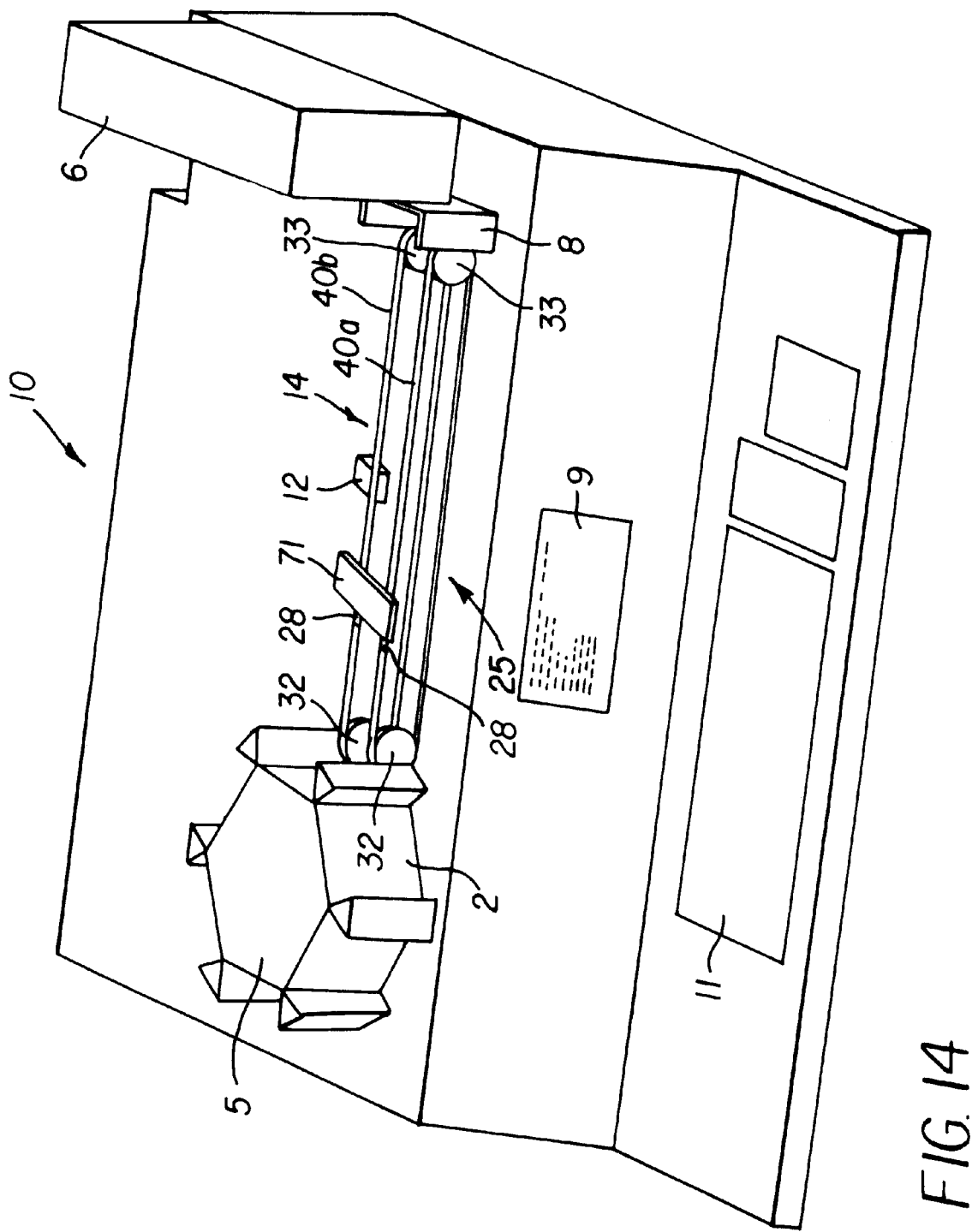
FIG. 14 is a pictorial view of a third embodiment of the present invention directed to a microscope slide printer system only.
Figure 15:
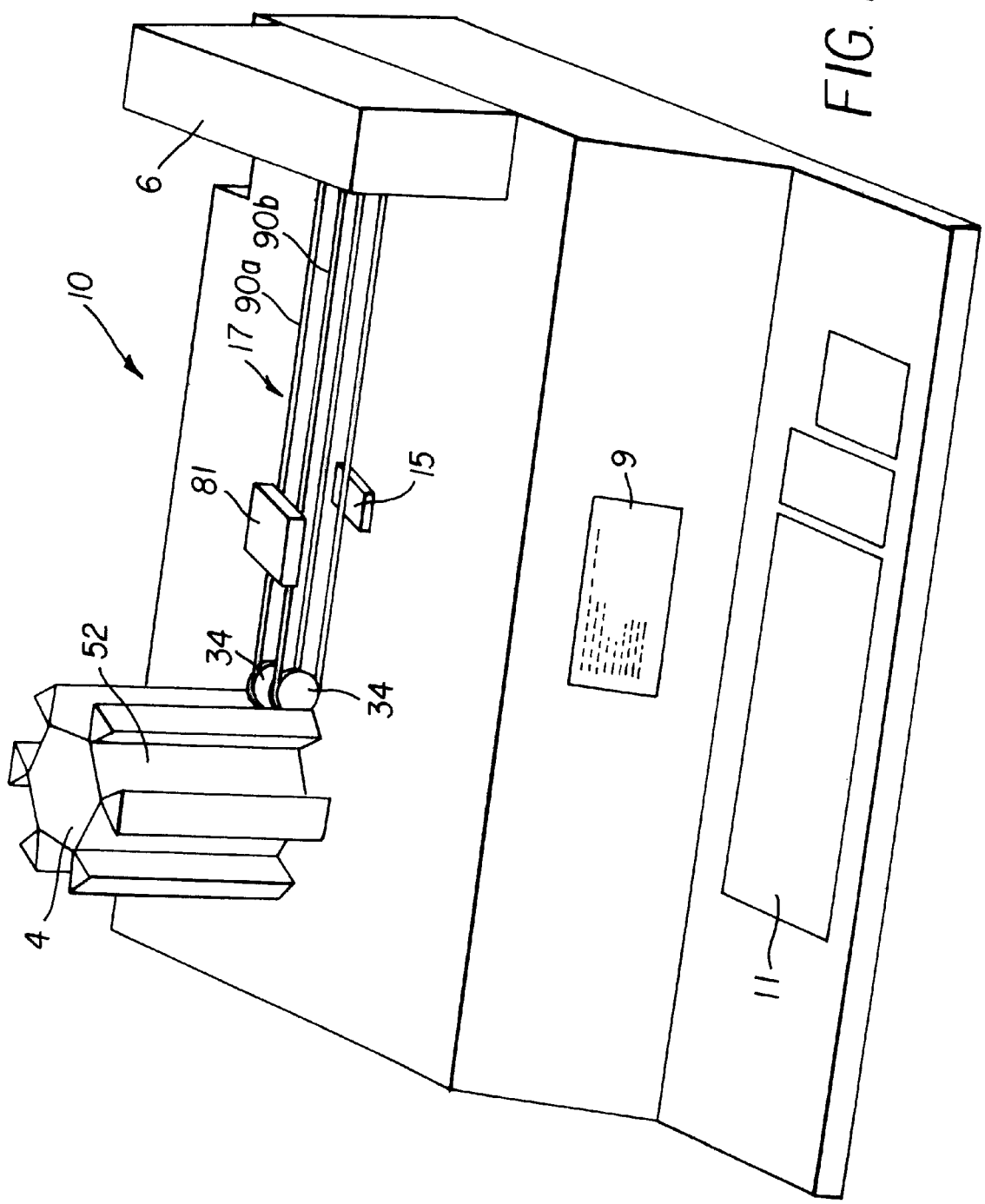
FIG. 15 is a pictorial view of a fourth embodiment of the present invention which is directed to a histology cassette printer system alone.

In still further embodiments, the invention may be provided as a slide printing unit only, or as a cassette printing unit only. FIG. 14 shows the system of the invention in a slide printing only variant, the drawing corresponding substantially to that of FIG. 3 but containing a slide printing line only. The further variant of FIG. 15 again corresponds substantially to FIG. 3, but provides a cassette printing line only. It will be appreciated that the depth, i.e. the front to rear dimension, of the casing of the unit may be reduced in a slide-only or cassette-only embodiment from the size shown in FIG. 14 or FIG. 15, in which the casing dimensions are the same as those of the casing of FIG. 3, even though in these present variants only a single processing line is present as compared with the combined unit of FIG. 3.

What is claimed is:

1. An apparatus for applying information to a medical slide comprising:

a printing medium, means for applying the printing medium onto a surface portion of a slide to define printed data, the printed data formed on said surface portion of the slide being resistant to removal or damage during subsequent handling or treatment of the slide, storage means for holding slides onto which data is to be printed, said storage means having a plurality of compartments, each for holding a multiplicity of slides, a printing station having said printing-medium applying means for applying data to a slide, transport means for conveying in one direction a slide onto which data is to be printed from the slide storage means to the slide printing station and the slide onto which data has been printed from the slide printing station to a slide discharge location, means for selecting one of said compartments for transfer of a slide therefrom to said transport means for said conveyance of said slide from said one compartment of the slide storage means to the slide discharge location, and means for enabling input of data to be printed onto said slide during said conveyance thereof in said one direction from said storage means to said slide discharge location.

2. An apparatus according to claim 1, comprising means for making the printed data formed on said surface portion of the slide or cassette resistant against removal or damage during subsequent handling or treatment of the slide or cassette.

3. An apparatus according to claim 2, wherein said means for making the printed data resistant applies a coating agent or medium to said surface portion of the slide or cassette to cover said printed data.

4. An apparatus according to claim 1, wherein said printing medium-applying means comprises an ink-jet printer head.

5. An apparatus according to claim 1, wherein the printing medium comprises a solvent and a vinyl resin.

6. An apparatus for printing data onto a histology cassette, comprising:

(a) storage means for holding a multiplicity of cassettes onto which data is to be printed, (b) a printing station for applying data to a selected cassette, said printing station having means for applying a printing medium directly onto a surface portion of a cassette to define printed data, the printed data formed on said surface portion of the cassette being resistant against removal or damage during subsequent handling or treatment of the cassette, (c) transport means for conveying a cassette onto which data is to be printed from the cassette storage means to the cassette printing station and for conveying a cassette onto which data has been printed from the cassette printing station to a cassette discharge location, (d) means for selectively enabling conveyance of a cassette from the cassette storage means to the cassette discharge location, and (e) means for enabling input of data to be printed onto a selected cassette during said conveyance.

7. An apparatus for printing data onto a medical slide or histology cassette, comprising:

(a) storage means for holding a multiplicity of slides onto which data is to he printed, (b) storage means for holding a multiplicity of cassettes onto which data is to be printed, (c) a printing station for applying data to a selected slide, the slide printing station having means for applying a printing medium directly onto a surface portion of a slide to define printed data, the printed data formed on said surface portion of the slide being resistant against removal or damage during subsequent handling or treatment of the slide, (d) a printing station for applying data to a selected cassette, the cassette printing station having means for applying a printing medium directly onto a surface portion of a cassette to define printed data, the printed data formed on said surface portion of the cassette being resistant against removal or damage during subsequent handling or treatment of the cassette, (e) transport means for conveying a slide onto which data is to be printed from the slide storage means to the slide printing station and for conveying a slide onto which data has been printed from the slide printing station to a slide discharge location, (f) transport means for conveying a cassette onto which data is to be printed from the cassette storage means to the cassette printing station and for conveying a cassette onto which data has been printed from the cassette printing station to a cassette discharge location, (g) means for selectively enabling conveyance of a slide or a cassette from the respective storage means to the respective discharge location, and (h) means for enabling input of data to be printed onto a selected slide or cassette during said conveyance.

8. An apparatus according to claim 7, wherein each storage means has a plurality of compartments for respective accommodation of slides or cassettes.

9. An apparatus according to claim 8, wherein each storage means is of generally cylindrical configuration and is mounted for rotation about a substantially vertical axis so that each compartment is selectively alignable with a respective transport means for selective conveyance of a slide or cassette.

10. An apparatus according to claim 9, further comprising respective drive means for respective rotation of the storage means between a series of positions of alignment with the respective transport means.

11. An apparatus according to claim 7, wherein each transport means comprises at least one belt disposed for pick-up of a slide or a cassette from the respective storage means and driving movement of the slide or cassette to the respective discharge location.

12. An apparatus according to claim 11, further comprising respective drive means for driving the respective transport means.

13. An apparatus according to claim 7, wherein the respective printing stations are located adjacent to the path of travel of a slide or cassette during conveyance of the slide or cassette by the respective transport means.

14. An apparatus according to claim 7, further comprising a control system having a multiplicity of sensors for detecting progressive movement of slides or cassettes through the apparatus, and for initiating and terminating drive of the respective transport means and actuating printing of the respective printing station in response to signals from said sensors.

15. An apparatus for printing data onto a medical slide or histology cassette comprising:
(a) storage means for holding a multiplicity of slides onto which data is to be printed,
(b) storage means for holding a multiplicity of cassettes onto which data is to be printed,
(c) a printing station for applying data to a selected slide,
(d) a printing station for applying data to a selected cassette,
(e) transport means for conveying a slide onto which data is to be printed from the slide storage means to the slide printing station and for conveying a slide onto which data has been printed from the slide printing station to a slide discharge location,
(f) transport means for conveying a cassette onto which data is to be printed from the cassette storage means to the cassette printing station and for conveying a cassette onto which data has bee printed from the cassette printing station to a cassette discharge location,
(g) means for selectively enabling conveyance of a slide or a cassette from the respective storage means to the respective discharge location ,k and
(h) means for enabling input of data to be printed onto a selected slide or cassette during said conveyance.

\* \* \* \* \*